(12) United States Patent
Earnshaw et al.

(10) Patent No.: US 9,794,958 B2
(45) Date of Patent: Oct. 17, 2017

(54) ADVANCED DATA CELL RESOURCE MAPPING

(71) Applicant: ONE MEDIA, LLC, Hunt Valley, MD (US)

(72) Inventors: Mark Earnshaw, Kanata (CA); Michael J. Simon, Frederick, MD (US); Kevin A. Shelby, Austin, TX (US)

(73) Assignee: One Media, LLC, Hunt Valley, MD (US)

( * ) Notice: Subject to any disclaimer, the term of this patent is extended or adjusted under 35 U.S.C. 154(b) by 0 days.

(21) Appl. No.: 15/429,865

(22) Filed: Feb. 10, 2017

(65) Prior Publication Data
US 2017/0156155 A1    Jun. 1, 2017

Related U.S. Application Data

(63) Continuation of application No. 15/094,193, filed on Apr. 8, 2016.

(60) Provisional application No. 62/144,558, filed on Apr. 8, 2015.

(51) Int. Cl.
| | |
|---|---|
| *H04B 7/216* | (2006.01) |
| *H04W 72/12* | (2009.01) |
| *H04L 29/08* | (2006.01) |
| *H04L 5/00* | (2006.01) |

(52) U.S. Cl.
CPC ......... *H04W 72/1263* (2013.01); *H04L 5/005* (2013.01); *H04L 5/0007* (2013.01); *H04L 69/323* (2013.01)

(58) Field of Classification Search
CPC .................................................. H04W 72/1263
USPC .......................................................... 370/335
See application file for complete search history.

(56) References Cited

U.S. PATENT DOCUMENTS

| | | | |
|---|---|---|---|
| 6,961,388 B2 | 11/2005 | Ling et al. | |
| 7,920,884 B2 | 4/2011 | Agrawal et al. | |
| 8,577,299 B2 | 11/2013 | Agrawal et al. | |
| 8,804,675 B2 | 8/2014 | Gutierrez et al. | |
| 9,036,567 B2 | 5/2015 | Krishnamoorthi et al. | |

(Continued)

FOREIGN PATENT DOCUMENTS

| | | | |
|---|---|---|---|
| CN | 105007145 A | 10/2015 | |
| CN | 105007146 A | 10/2015 | |

(Continued)

OTHER PUBLICATIONS

English translation for Chinese patent publication No. CN 105007145 A, published Oct. 28, 2015, 17 pages, translated by Google at https://patents.google.com.

(Continued)

*Primary Examiner* — Shripal Khajuria
(74) *Attorney, Agent, or Firm* — Sterne, Kessler, Goldstein & Fox, PLLC

(57) ABSTRACT

An example method of mapping a plurality of modulation symbols of a plurality of physical layer pipes present in a frame to a resource grid of data cells for the frame is described. The modulation symbols of the plurality of physical layer pipes are represented by a two-dimensional array comprising the modulation symbol values for the plurality of physical layer pipes and the resource grid of data cells is represented by a one-dimensional sequentially indexed array.

30 Claims, 10 Drawing Sheets

(56) References Cited

U.S. PATENT DOCUMENTS

| | | | |
|---|---|---|---|
| 9,043,687 | B2 | 5/2015 | Ko et al. |
| 9,179,440 | B2 | 11/2015 | Gutierrez et al. |
| 9,253,428 | B2 | 2/2016 | Allison, III et al. |
| 9,258,800 | B2 | 2/2016 | Kwak et al. |
| 9,300,327 | B2 | 3/2016 | Ko et al. |
| 9,307,273 | B2 | 4/2016 | Yoo et al. |
| 9,363,040 | B2 | 6/2016 | Ko et al. |
| 9,369,325 | B2 | 6/2016 | Kim et al. |
| 9,386,562 | B2 | 7/2016 | Gutierrez et al. |
| 2010/0195633 | A1 | 8/2010 | Vare et al. |
| 2011/0158355 | A1 | 6/2011 | Shinya et al. |
| 2012/0243561 | A1 | 9/2012 | Loghin et al. |
| 2013/0265957 | A1 | 10/2013 | Mourad et al. |
| 2014/0112274 | A1 | 4/2014 | Moon et al. |
| 2015/0006586 | A1 | 1/2015 | Mourad et al. |
| 2015/0043491 | A1 | 2/2015 | Eng et al. |
| 2015/0049642 | A1 | 2/2015 | Eng et al. |
| 2015/0055727 | A1 | 2/2015 | Kim et al. |
| 2015/0181281 | A1 | 6/2015 | Ko et al. |
| 2015/0195067 | A1 | 7/2015 | Kim et al. |
| 2015/0236884 | A1 | 8/2015 | Suh et al. |
| 2015/0304070 | A1 | 10/2015 | Baek et al. |
| 2015/0358106 | A1* | 12/2015 | Limberg ............. H04L 27/2003 375/308 |
| 2016/0057504 | A1 | 2/2016 | Shelby et al. |
| 2016/0094970 | A1 | 3/2016 | Oh et al. |
| 2016/0105223 | A1 | 4/2016 | Baek et al. |
| 2016/0119908 | A1 | 4/2016 | Kwak et al. |
| 2016/0164541 | A1 | 6/2016 | Ko et al. |
| 2016/0164637 | A1 | 6/2016 | Suh et al. |
| 2016/0165273 | A1 | 6/2016 | Moon et al. |
| 2016/0165274 | A1 | 6/2016 | Moon et al. |
| 2016/0173312 | A1 | 6/2016 | Moon et al. |
| 2016/0182189 | A1* | 6/2016 | Stadali ................. H04L 1/0003 370/474 |
| 2016/0191288 | A1 | 6/2016 | Baek et al. |
| 2016/0198217 | A1 | 7/2016 | Ko et al. |
| 2016/0218823 | A1* | 7/2016 | Baek ..................... H04L 1/0041 |
| 2016/0241358 | A1 | 8/2016 | Ko et al. |
| 2016/0241365 | A1 | 8/2016 | Bae et al. |
| 2016/0302201 | A1 | 10/2016 | Earnshaw et al. |

FOREIGN PATENT DOCUMENTS

| | | |
|---|---|---|
| CN | 105024791 A | 11/2015 |
| CN | 105024952 A | 11/2015 |
| CN | 105024963 A | 11/2015 |
| CN | 105245479 A | 1/2016 |
| CN | 105282076 A | 1/2016 |
| CN | 105282078 A | 1/2016 |
| CN | 105323048 A | 2/2016 |
| CN | 105743624 A | 7/2016 |
| CN | 105991266 A | 10/2016 |
| CN | 105991495 A | 10/2016 |
| CN | 105991498 A | 10/2016 |
| CN | 105991500 A | 10/2016 |
| CN | 105991501 A | 10/2016 |
| CN | 105991502 A | 10/2016 |

OTHER PUBLICATIONS

English translation for Chinese patent publication No. CN 105007146 A, published Oct. 28, 2015, 17 pages, translated by Google at https://patents.google.com.

English translation for Chinese patent publication No. CN 105024791 A, published Nov. 4, 2015, 14 pages, translated by Google at https://patents.google.com.

English translation for Chinese patent publication No. CN 105024952 A, published Nov. 4, 2015, 20 pages, translated by Google at https://patents.google.com.

English translation for Chinese patent publication No. CN 105024963 A, published Nov. 4, 2015, 23 pages, translated by Google at https://patents.google.com.

English translation for Chinese patent publication No. CN 105245479 A, published Jan. 13, 2016, 28 pages, translated by Google at https://patents.google.com.

English translation for Chinese patent publication No. CN 105282076 A, published Jan. 27, 2016, 21 pages, translated by Google at https://patents.google.com.

English translation for Chinese patent publication No. CN 105282078 A, published Jan. 27, 2016, 24 pages, translated by Google at https://patents.google.com.

English translation for Chinese patent publication No. CN 105323048 A, published Feb. 10, 2016, 26 pages, translated by Google at https://patents.google.com.

English translation for Chinese patent publication No. CN 105743624 A, published Jul. 6, 2016, 38 pages, translated by Google at https://patents.google.com.

English translation for Chinese patent publication No. CN 105991266 A, published Oct. 5, 2016, 29 pages, translated by Google at https://patents.google.com.

English translation for Chinese patent publication No. CN 105991495 A, published Oct. 5, 2016, 21 pages, translated by Google at https://patents.google.com.

English translation for Chinese patent publication No. CN 105991498 A, published Oct. 5, 2016, 56 pages, translated by Google at https://patents.google.com.

English translation for Chinese patent publication No. CN 105991500 A, published Oct. 5, 2016, 40 pages, translated by Google at https://patents.google.com.

English translation for Chinese patent publication No. CN 105991501 A, published Oct. 5, 2016, 44 pages, translated by Google at https://patents.google.com.

English translation for Chinese patent publication No. CN 105991502 A, published Oct. 5, 2016, 25 pages, translated by Google at https://patents.google.com.

*Digital Video Broadcasting (DVB); Frame structure channel coding and modulation for a second generation digital terrestrial television broadcasting system (DVB-T2)*, ETSI EN 302 755, V1.3.1, 188 pages (Apr. 2012).

International Search Report and Written Opinion, dated Jul. 14, 2016, for PCT Appl. No. PCT/US16/26647, filed Apr. 8, 2016, 9 pages.

* cited by examiner

ADVANCED DATA CELL RESOURCE MAPPING

CROSS-REFERENCE TO RELATED APPLICATION

This application is a continuation of U.S. patent application Ser. No. 15/094,193 filed on Apr. 8, 2016, which claims benefit of U.S. Provisional Patent Application No. 62/144,558 filed on Apr. 8, 2015, both of which are incorporated by reference herein in their entirety.

FIELD OF DISCLOSURE

The present disclosure relates to the field of wireless communication, and more particularly, to an advanced data cell resource mapping method and algorithm.

BACKGROUND

Utilization of the broadcast spectrum is changing and moving away from a monolithic model in which single types of content, such as television broadcast signals, were broadcast in the spectrum to a multicasting model in which multiple types of content and services are broadcast simultaneously. In order to achieve such diverse utilization of the broadcast spectrum, data must be multiplexed into a signal and mapped to specific physical resources within the transmitted signal.

FIG. 1 illustrates an overview of the process 100 for generating an Orthogonal Frequency Division Multiplexed (OFDM) transmitted signal at the physical layer. Data in the form of information bits belonging to one or more Physical Layer Pipes PLP1 through PLPn (hereinafter referred to as "PLP") 102 arrives. It should be appreciated that each PLP 102 carries data associated with a particular service. For example, a PLP 102 may carry data associated with a television program, the video stream for a program, the audio stream for a program, closed-caption information, or data associated with other suitable types of services.

The data belonging to each PLP 102 is sent through Forward Error Correction ("FEC") 103 coding, such as Low Density Parity Check ("LDPC") coding or turbo coding. The coded bits are used to modulate 104 a constellation symbol using a modulation approach such as Quadrature Phase Shift Keying ("QPSK"), for example. Time interleaving 106 may optionally be applied to the modulation symbols.

The resulting modulation symbols from one or multiple PLPs 102 are then mapped 108 to specific resources or data cells within a block of resources. Such a block of resources may be termed as a frame, as a partition within a frame, or as a sub-frame within a frame. Specifically, a partition can be thought of as a subset of resources within a frame, with a frame containing one or more partitions. The block of resources can be represented as a logical grid 200 of data cells with dimensions in both time and frequency domains, as illustrated in FIG. 2. For example, each data cell 202 can carry one modulation symbol while each column 204 of data cells belongs to one OFDM symbol.

Referring back to FIG. 1, the data cells belonging to each OFDM symbol may undergo optional frequency interleaving 110 on a per OFDM symbol basis in order to improve frequency diversity. Scattered pilot, edge pilot, and/or continual pilot values are inserted 112 at appropriate locations within each OFDM symbol to assist with channel estimation and carrier tracking at a receiver. The resulting multiplexed data and pilot cells then undergo an Inverse Fast Fourier Transform ("IFFT") 114 on a per OFDM symbol basis. Peak to Average Power Ratio ("PAPA") reduction techniques 116 may optionally be applied to the resulting signal. Finally, a Guard Interval ("GI") or cyclic prefix is prepended 118 to the time-domain samples for each OFDM symbol.

It should be appreciated that are three types of OFDM symbols. At the beginning of each frame or partition, zero or more OFDM symbols carrying preamble signaling may be present. Preamble signaling contains information about how PLPs are encoded, modulated, and mapped to resources within the transmitted signaling. These are followed by one or more data OFDM symbols. An optional frame or partition closing symbol may be present as the final OFDM symbol of a frame or partition.

Each of the three types of OFDM symbols, if present, may carry one or more data cells if space is available. The number of data cells per OFDM symbol is constant within a particular type of OFDM symbol. Conversely, the number of data cells per OFDM symbol may be different when comparing two different types of OFDM symbol.

A linear one-dimensional logical addressing scheme, such as the addressing scheme 300 used in the DVB-T2 standard and illustrated in FIG. 3, has been commonly used to facilitate the mapping 108 or addressing of PLPs to specific data cells within blocks described. As illustrated, $N_S^P$ represents the number of OFDM symbols carrying preamble signaling and available to carry payload data ($N_S^P \geq 0$), $N_S^D$ represents the number of OFDM symbols carrying normal data ($N_S^D \geq 1$), $N_S^C$ represents the number of frame closing symbols that are present ($0 \leq N_S^C \leq 1$), $N_C^P$ represents the number of data cells carried in preamble OFDM symbols if such OFDM symbols are present and available to carry payload data, $N_C^D$ represents the number of data cells carried per normal data OFDM symbol, and $N_C^C$ represents the number of data cells carried in the frame closing symbol if a frame closing symbol is present. Logical indexing of the data cells begins with the first available data cell of the first OFDM symbol belonging to the frame or partition, and then continues on with the remaining data cells of the same OFDM symbol. After all of the data cells belonging to an OFDM symbol have been indexed, indexing moves to the first data cell of the next OFDM symbol. It should be appreciated that the frame or partition closing symbol, if present, generally contains fewer data cells than a normal data OFDM symbol due to the frame closing symbol carrying more pilots.

It should be appreciated that in DVB-T2, PLPs are classified as either Type-1 or Type-2 PLPs. Data cells belonging to a Type-1 PLP are all contiguous in terms of logical data cell addresses. In particular, all Type-1 PLPs contained in a particular frame or partition are mapped to data cells starting at the beginning of the frame or partition. All of the Type-1 PLPs are mapped to contiguous blocks of data cells before any of the Type-2 PLPs are mapped to data cells. That is, the logical addresses of all of the data cells belonging to all of the Type-1 PLPs present in a frame or partition have a lower logical address value than any of the data cells belonging to any of the Type-2 PLPs present in the same frame or partition.

The data cells belonging to a Type-2 PLP, on the other hand, are not all contiguous in terms of logical data cell addresses. Rather, a technique called sub-slicing is used to divide each Type-2 PLP into a set of equal-sized sub-slices, where each sub-slice consists of a set of contiguously-addressed data cells. For example, a Type-2 PLP with a total size of 1000 data cells might be divided into ten (10) sub-slices, with each sub-slice consisting of 100 contiguously-addressed data cells. However, the logical address locations of the ten (10) sub-slices would not represent ten (10) contiguous blocks of addresses but the ten (10) blocks would instead be distributed throughout the frame or partition.

In DVB-T2, sub-slices from multiple Type-2 PLPs are interleaved with each other. That is, the first sub-slice of the first Type-2 PLP will appear, the first sub-slice of the second Type-2 PLP will then appear, and so on with all of the first sub-slices of all of the Type-2 PLPs present in a frame or partition. Following this collection of first sub-slices, the second sub-slice of the first Type-2 PLP will appear, the second sub-slice of the second Type-2 PLP will appear, and so on. This continues until all rounds of sub-slices have been completed.

In DVB-T2, a super-frame is defined as a group of multiple contiguous in-time frames. The values of certain control signaling fields are constrained to remain fixed over the duration of a super-frame.

In order to facilitate resource mapping, the DVB-T2 standard includes control signaling in a preamble which is located at the beginning of each frame. Relevant portions of this preamble include the L1-Post signaling, which carries the bulk of the control signaling describing the contents of each frame and of the overall super-frame. The L1-Post is itself divided into several parts, including a configurable portion and a dynamic portion. Control signaling contained in the configurable part of the L1-Post is constrained to remain static or fixed over the duration of a super-frame while control signaling contained in the dynamic part of the L1-Post may vary from one frame to another within the same super-frame.

It should be appreciated, however, that although the DVB-T2 standard may be adequate for use in example systems that only send a single type of service or data such as TV broadcasting program, since there is no need to change parameters often, the DVB-T2 standard is not flexible. Rather, the standard is restrictive in terms of options available for mapping to data cells and ability to change parameters often. In particular, the DVB-T2 standard imposes the following constraints: (1) a given PLP is constrained to only be a Type-1 or Type-2 PLP but the PLP cannot switch between the two types, which limits diversity; (2) all Type-1 PLPs must occur before any Type-2 PLP within the same frame; (3) Type-2 PLPs are limited in size to between 2 and 6480 sub-slices per frame; (4) the same number of sub-slices per frame must be used for all frames within a super-frame; (5) the same sub-slice interval, which indicates the number of data cells from the start of one sub-slice of a Type-2 PLP to the start of the next sub-slice of the same PLP within the current frame, must be used for all Type-2 PLPs present within the same frame; (6) all Type-2 PLPs within a given frame must have the same number of sub-slices; and (7) all Type-2 PLPs must have their first sub-slice occur before the second sub-slice of any Type-2 PLP occurs.

Thus, the DVB-T2 standard may be overly restrictive and therefore inadequate if implemented by a system, such as an ATSC 3.0 broadcast system, wherein PLPs associated with a variety of types of services may be intended to be multiplexed and broadcast via a single frame.

SUMMARY

An example method of mapping a plurality of modulation symbols of a plurality of physical layer pipes present in a frame to a resource grid of data cells for the frame is described. The modulation symbols of the plurality of physical layer pipes are represented by a two-dimensional array comprising the modulation symbol values for the plurality of physical layer pipes and the resource grid of data cells is represented by a one-dimensional sequentially indexed array. The method includes the step of determining whether a current physical layer pipe of the plurality of physical layer pipes is dispersed or non-dispersed. The method further includes the step of, responsive to determining that the current physical layer pipe is non-dispersed, populating a next available position of the one-dimensional array with a first modulation symbol value of the current physical layer pipe from the two-dimensional array, wherein the step is repeated for all modulation symbol values of the current physical layer pipe. The method further includes the step of, responsive to determining that the current physical layer pipe is dispersed, calculating a sub-slice size for the current physical layer pipe by dividing the size of the physical layer pipe with the number of slices in the current physical layer pipe, and populating a next available position of the one-dimensional array with a first modulation symbol value of a current sub-slice of the current physical layer pipe from the two-dimensional array, wherein the step is repeated for all modulation symbol values of the current sub-slice and for all sub-slices of the current physical layer pipe. The steps of the method are repeated for all of the plurality of physical payer pipes in the present frame.

An example computer program product for mapping a plurality of modulation symbols of a plurality of physical layer pipes present in a frame to a resource grid of data cells for the frame is described. The modulation symbols of the plurality of physical layer pipes are represented by a two-dimensional array comprising the modulation symbol values for the plurality of physical layer pipes and the resource grid of data cells is represented by a one-dimensional sequentially indexed array. The computer program product includes one or more computer-readable tangible storage devices, and program instructions stored on at least one of the one or more storage devices. The program instructions include first program instructions for determining whether a current physical layer pipe of the plurality of physical layer pipes is dispersed or non-dispersed. The program instructions further include second program instructions for, responsive to the first program instructions determining that the current physical layer pipe is non-dispersed, populating a next available position of the one-dimensional array with a first modulation symbol value of the current physical layer pipe from the two-dimensional array. The second program instructions are configured to execute for all modulation symbol values of the current physical layer pipe. The program instructions further include third program instructions for, responsive to the first program instructions determining that the current physical layer pipe is dispersed, calculating a sub-slice size for the current physical layer pipe by dividing the size of the physical layer pipe with the number of sub-slices in the current physical layer pipe, and populating a next available position of the one-dimensional array with a first modulation symbol value of a current sub-slice of the current physical layer pipe from the two-dimensional array. The third program instructions are configured to execute for all modulation symbol values of the current sub-slice and for all sub-slices of the current physical layer pipe.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
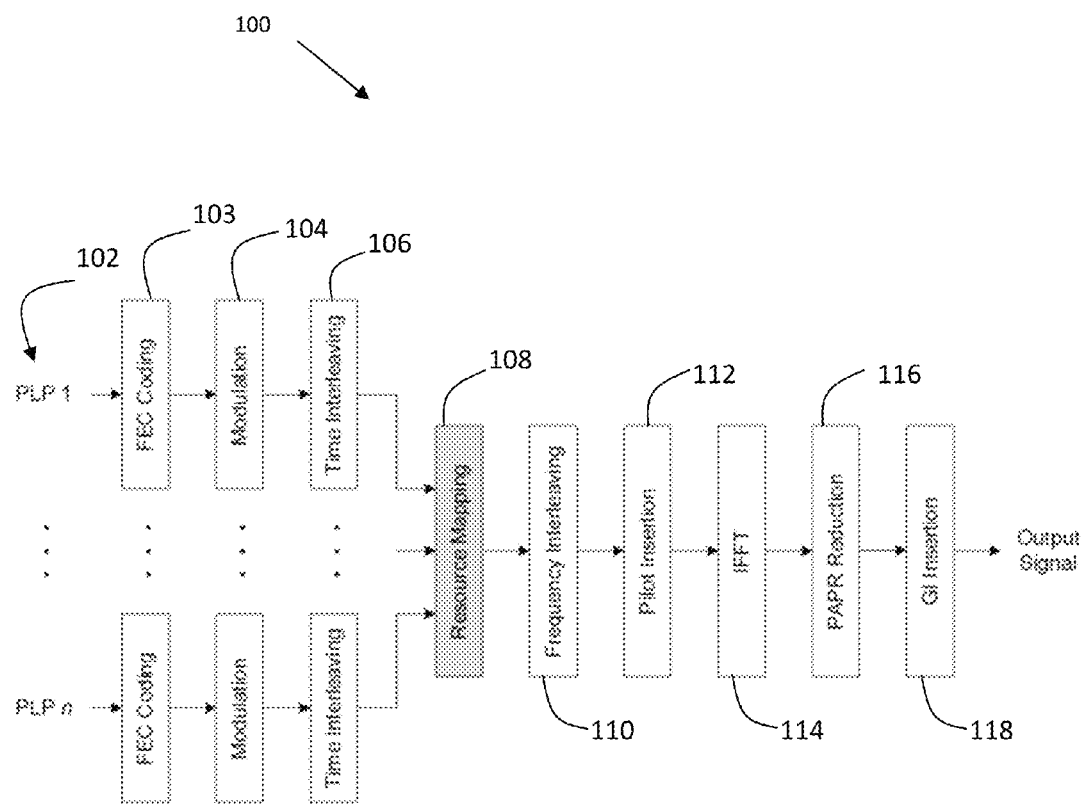
FIG. 1 illustrates an overview of an example process for generating an Orthogonal Frequency Division Multiplexed transmitted signal at the physical layer.
Figure 2:
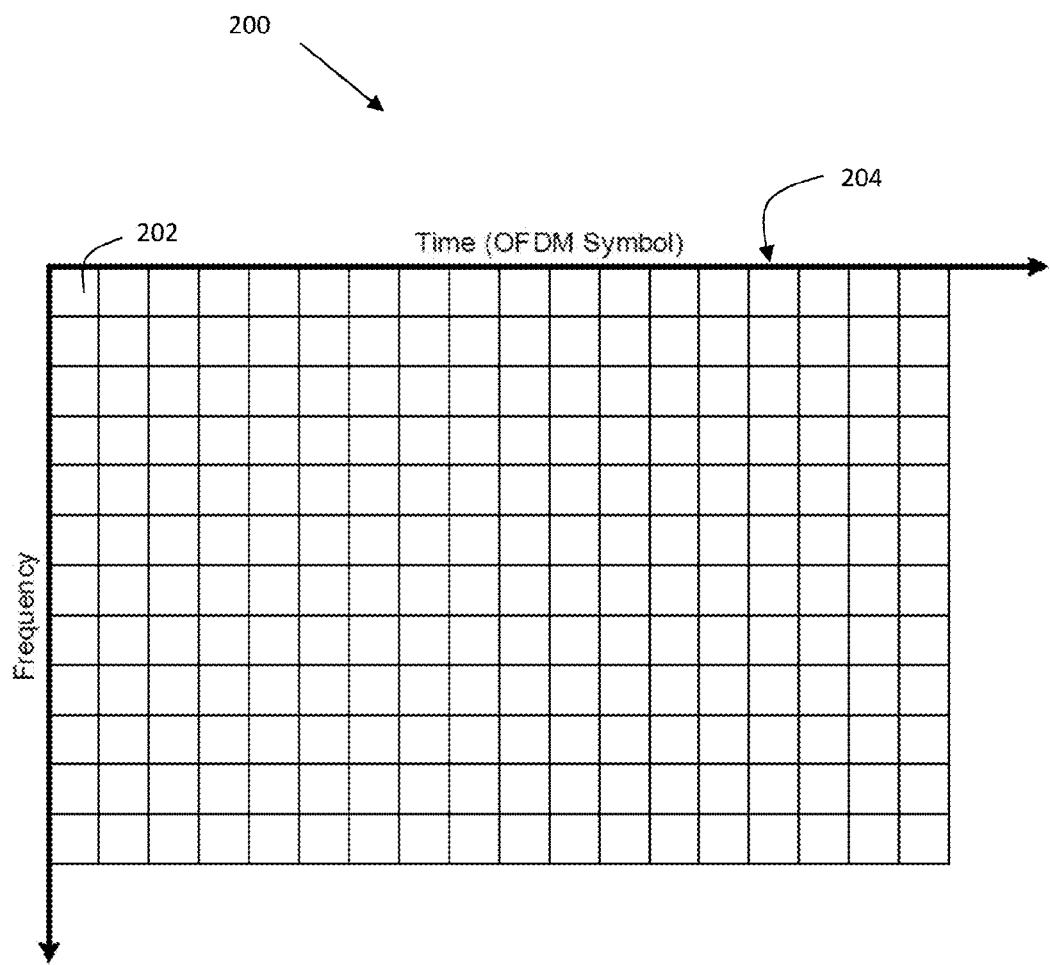
FIG. 2 illustrates an example logical grid of data cells.
Figure 3:
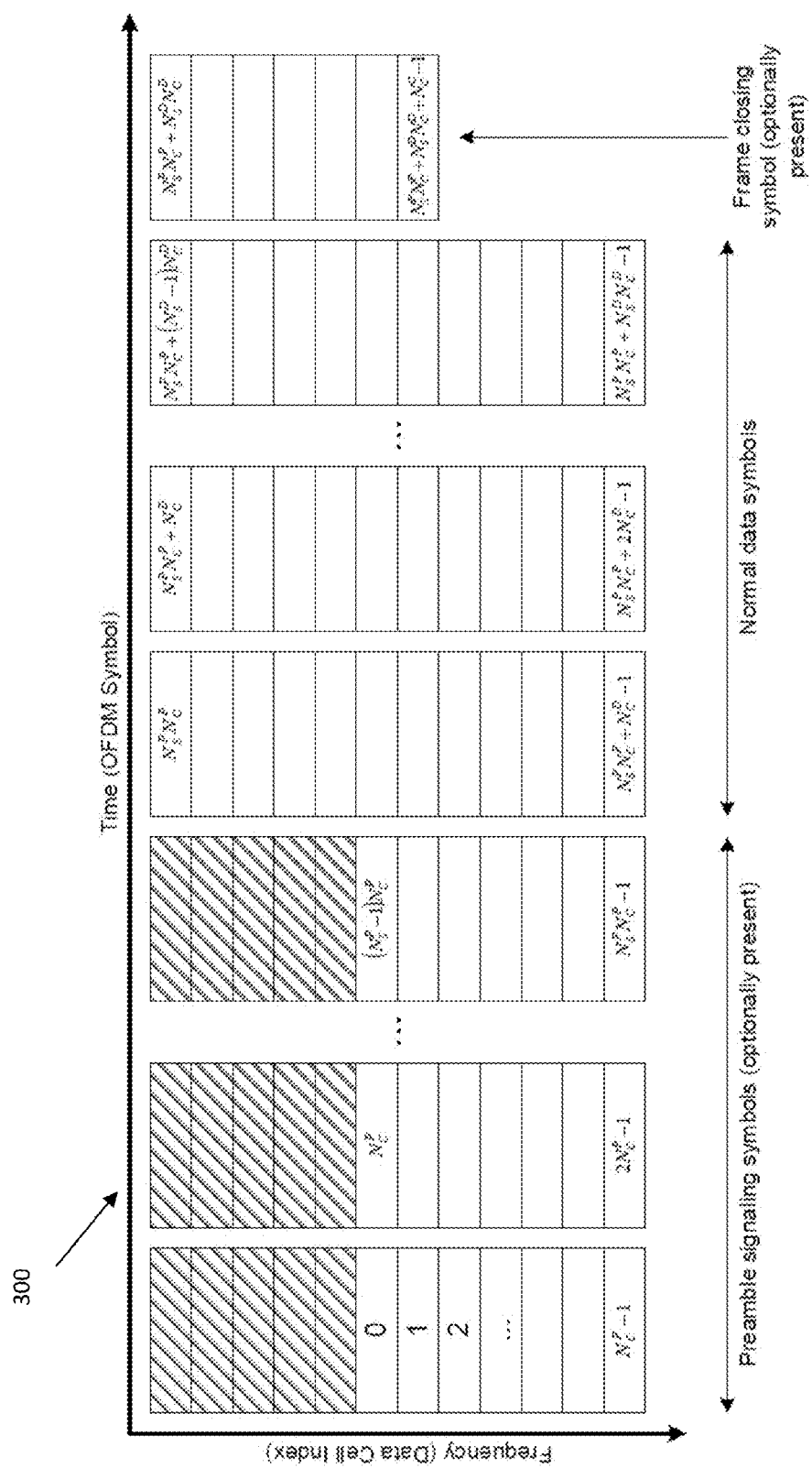
FIG. 3 illustrates an example addressing scheme.

An enhanced resource mapping method and algorithm is described herein, relaxing the restrictive constraints imposed by the DVB-T2 standard, thereby resulting in increased flexibility with respect to the way PLPs can be multiplexed into a single frame for broadcast. In particular, the method and algorithm described herein provides support for increased three-dimensional flexibility including frequency division multiplexing, time division multiplexing, and layered division multiplexing. Such flexibility enables broadcasting of multiple types of information or services in one frame while optimizing parameters for each service.

In addition, having flexible frame sizes, rather than being restricted to a single frame size within a super-frame as in DVB-T2, may be advantageous in that it may be desirable to use different frame sizes for different types of data broadcasts. For example, it may be desirable to transmit intermittent small bits of information, such as when sending IoT data, instead of always sending the same larger size frames of data. In another example, it may be desirable to use larger frame sizing for a high resolution TV signal while it may be desirable to use smaller frame sizing for a low resolution TV signal.

Also, the ability to map a particular PLP to a particular time frequency region of the overall frame, as will be described, may be desirable and beneficial. For example, a specific narrow frequency band may be designated to send a type of service to a special type of receiver that can only pick up that particular narrow band. Since the device may reside in a fixed area of a frequency band and may be designed to do one very simple thing like picking up information sent in that frequency band, the device may be cost effective and consume low power.

It should be appreciated that the ability to map a particular PLP to a particular time frequency region of the overall frame is not only useful in dividing a band into sub bands, but also for channel bonding where a PLP is transmitted over multiple RF channels.

It should be further appreciated that such flexibility in data cell resource mapping may allow for carving out unused areas of a band. For example, a region of a band may be selected to be empty so that the region may be used to support two-way communication. It should be appreciated though that the uplink communication may be performed through means other than broadcast, which may need an empty frequency through which to communicate. Thus, parts of a band could be blanked out or reserved to allow for other communications to prevail without interference. This can also be used to mitigate interference. For example, in the case of adjacent channel interference, data could be moved to a region with nulled out or reserved frequency bands.

In order to achieve such flexibility, the enhanced resource mapping method implements control signaling fields that alleviate the previously described restrictions imposed by the existing DVB-T2 standard. On a per-PLP basis within each frame or partition, the control signaling fields could be used to signal the resource mappings as described herein. That is, for each PLP that is present within a particular frame or partition, the signaling fields would be used to describe the resource mapping for that particular PLP. Described herein are descriptions of how the seven (7) previously noted constraints are addressed in the enhanced resource mapping method using control signaling, including PLP_SIZE, PLP_TYPE, STARTING_POSITION, NUM_SUB_SLICES, and SUB_SLICE_INTERVAL signaling fields.

Switching a PLP Type

The enhanced resource mapping method includes assigning PLPs to be either non-dispersed, meaning no sub-slicing and all data cells belonging to the PLP are logically contiguous, or to be dispersed, meaning sub-slicing is present and not all data cells belonging to the PLP are logically contiguous. This assignment is only for the current frame or partition, however, and therefore a PLP could be non-dispersed in one frame or partition, and dispersed in the next frame or partition. It should be appreciated that the classification between non-dispersed and dispersed PLPs may solely be for reasons of control signaling efficiency since a non-dispersed PLP does not require as many signaling fields to describe its resource mapping as does a dispersed PLP.

Assigning the PLPs is accomplished using a PLP_TYPE signal which indicates whether the current PLP is non-dispersed or dispersed. For example, PLP_TYPE may be a single bit wherein PLP_TYPE=1 may indicate that the PLP is dispersed while PLP_TYPE=0 may indicate that the PLP is non-dispersed.

It should be appreciated that since PLP_TYPE is signaled for each PLP within a given sub-frame, and is not constrained to be the same for a given PLP from one sub-frame to another, as is the case in DVB-T2, a PLP can thus switch types between sub-frames.

It should be appreciated that the PLP_TYPE field is explicitly present in the ATSC 3.0 Physical Layer standard as L1D_plp_type and is a 1-bit field. L1D_plp_type is signaled per PLP within each sub-frame but is not included for Enhanced PLPs when Layered-Division Multiplexing is used. Rather, an Enhanced PLP automatically takes the same PLP type as the Core PLP(s) with which it is Layered-Division Multiplexed.

Relative Positioning of PLPs Within a Sub-frame

The enhanced resource mapping method eliminates the constraint on the relative positioning of non-dispersed and dispersed PLPs present within the same frame or partition. This is accomplished using a STARTING_POSITION signal which can refer to a location anywhere within a sub-frame, regardless of the value of PLP_TYPE for that same PLP. It indicates the index of the data cell corresponding to the first data cell of the first sub-slice of the current PLP. In one example, the STARTING_POSITION signaling field is 24 bits long. It should be appreciated that the STARTING_POSITION signaling field is signaled per PLP within each sub-frame. Thus, a PLP may start anywhere within the current frame or partition and therefore relative positioning within a sub-frame is not restrained.

It should be appreciated that the STARTING_POSITION field is explicitly present in the ATSC 3.0 Physical Layer standard as L1D_plp_start and is a 24-bit field. L1D_plp_start is signaled per PLP within each sub-frame.

Number of Sub-slices Per Frame

The enhanced resource mapping method eliminates the constraint on the number of sub-slices per frame allowed for a Type-2 PLP. Rather than limiting the number of sub-slices per frame to 6480, as does the DVB-T2 standard, the enhanced resource mapping method enables a particular PLP to have a number of sub-slices ranging from two (2) up to the actual length of the PLP as measured in data cells, which could conceivably be much larger than 6480. This is accomplished using a NUM_SUB_SLICES signaling field which indicates the number of sub-slices used for the current PLP within the current frame or partition. It should be appreciated that this signal is only required when the associated PLP is a dispersed type.

In one example, NUM_SUB_SLICES=1 shall indicate that sub-slicing is not applied to the current PLP. In one example, NUM_SUB_SLICES=0 shall be a reserved value. It should be appreciated that NUM_SUB_SLICES shall be set on a per-PLP basis and shall not be constrained to be the same for all PLPs within a given partition.

It should be appreciated that when a PLP has the maximum number of sub-slices, which would be the length of the PLP, the resulting sub-slice size would be 1.

In one example, the length of the PLP, which sets the maximum possible value of NUM_SUB_SLICES, is defined by a PLP_SIZE signal which indicates the number of data cells allocated to the current PLP within the current frame or partition. In other words, PLP_SIZE is constrained to be an integer multiple of NUM_SUB_SLICES for the current PLP. It should be appreciated that this may include padding cells if required. Equivalently, PLP_SIZE corresponds to the number of modulation symbols, including any modulation symbols used for padding purposes, belonging to the current PLP within the current frame.

It should be appreciated that it may also be possible to calculate PLP_SIZE from other parameters that might be signaled or otherwise known, such as a code block size, modulation level, and number of code blocks belonging to the current PLP within the current frame or partition.

It should be further appreciated that dividing PLP_SIZE by NUM_SUB_SLICES gives the number of data cells per sub-slice for the current PLP. Thus, one alternative would be to signal the number of data cells per sub-slice (e.g. SUB_SLICE_SIZE) for the current PLP, and then the number of sub-slices for the current PLP could be calculated by dividing PLP_SIZE by SUB_SLICE_SIZE.

In one example, a possible size for the NUM_SUB_SLICES signaling field is 24 bits if sub-slice interleaving on a data-cell-by-data-cell basis is desired. Alternatively a smaller number of bits could be used for this signaling field if a larger minimum unit of granularity for sub-slice size is desired.

It should be appreciated that the NUM_SUB_SLICES field is explicitly present in the ATSC 3.0 Physical Layer standard as L1D_plp_num_subslices and is a 14-bit field. L1D_plp_num_subslices signals one less than the actual number of sub-slices, and can therefore signal a maximum of 16384 subslices for the corresponding PLP. L1D_plp_num_subslices is signaled for each dispersed PLP within each sub-frame.

Varying Sub-slicing Parameters

The enhanced resource mapping method eliminates the constraint on the number of sub-slices per frame used for all frames within a super-frame. Instead of requiring the same number of sub-slices per frame to be used for all frames within a super-frame, sub-slicing parameters may vary on a frame-by-frame basis. This is again facilitated by the NUM_SUB_SLICES signaling field which is signaled for each dispersed PLP within each sub-frame, and can thus vary on a sub-frame-by-sub-frame basis.

Interval Between Successive Sub-slices

In contrast to the DVB-T2 standard which constrains the interval between successive sub-slices of a given PLP to be the same value for all PLPs within the same frame, the enhanced resource mapping method enables the interval between successive sub-slices of a given PLP to be set on a per PLP basis rather than on a per frame basis. Hence, different PLPs present within the same frame may use different sub-slice intervals. This is accomplished using a SUB_SLICE_INTERVAL signaling field which indicates the number of sequentially-indexed data cells measured from the beginning of a sub-slice for a PLP to the beginning of the next sub-slice for the same PLP. The SUB_SLICE_INTERVAL signaling field is signaled for each dispersed PLP within each sub-frame. It should be appreciated that the SUB_SLICE_INTERVAL signaling field is only required when the associated PLP is a dispersed type.

The SUB_SLICE_INTERVAL signal may be used in combination with a STARTING_POSITION signaling field, which indicates the index of the data cell corresponding to the first data cell of the first sub-slice of the current PLP. For example, if STARTING_POSITION=100 and SUB_SLICE_INTERVAL=250, then the first data cell of the first sub-slice of the current PLP would be located at index 100, and the first data cell of the second sub-slice of the current PLP would be located at index 100+250=350.

It should be appreciated that STARTING_POSITION is signaled per PLP within each sub-frame, and therefore a PLP may start anywhere within the current frame or partition. In one example, the STARTING_POSITION signaling field is 24 bits. In one example, the SUB_SLICE_INTERVAL signaling field is 24 bits.

It should be appreciated that the SUB_SLICE_INTERVAL field is explicitly present in the ATSC 3.0 Physical Layer standard as L1D_plp_subslice_interval and is a 24-bit field. L1D_plp_subslice_interval is signaled for each dispersed PLP within each sub-frame.

Sub-slicing of Different PLPs

The enhanced resource mapping method eliminates the constraint on the number of sub-slices different PLPs can have within the same frame, as does the DVB-T2 standard. This is facilitated, again by the NUM_SUB_SLICES signaling field which is signaled for each dispersed PLP within each sub-frame, and thus different dispersed PLPs within the same sub-frame can have different number of sub-slices.

PLP Starting Position and Interleaving

The enhanced resource mapping method eliminates the constraint on the starting position of a PLP relative to another PLP within the same sub-frame which is imposed by the DVB-T2 standard. Instead, because the STARTING_POSITION signaling field is signaled per PLP within each sub-frame, a PLP can begin anywhere in the frame or partition, and there are no restrictions forcing sub-slices of different PLPs to necessarily be fully or partially interleaved with each other.

It should be appreciated that relaxing the constraints using the signaling fields as described provides much greater flexibility when multiplexing and/or interleaving a larger number of PLPs together within a single frame or partition. It should be further appreciated that, although a number of the resource mapping constraints have been relaxed as described above, it may be important to ensure that resource mapping parameters are configured such that there are no collisions between the resource mappings of different PLPs present within the same frame or partition.

In one example, the enhanced resource mapping method may include an additional signaling field in order to reduce the total number of required control signaling bits. In particular, a SUB_SLICE_FLAG signaling field indicates whether the next control signaling field that is included is NUM_SUB_SLICES or SUB_SLICE_SIZE. The SUB_SLICE_FLAG signaling field is a 1-bit field set to either 0 or 1. For example, SUB_SLICE_FLAG=0 may indicate that NUM_SUB_SLICES is included as a signaling field and SUB_SLICE_SIZE is not included. SUB_SLICE_SIZE can then be calculated by dividing PLP_SIZE by NUM_SUB_SLICES. This option can be used, for example, when the desired resource mapping for the current PLP is such that NUM_SUB_SLICES≤SUB_SLICE_SIZE. SUB_SLICE_FLAG=1, on the other hand, may indicate that SUB_SLICE_SIZE is included as a signaling field and NUM_SUB_SLICES is not included. NUM_SUB_SLICES can then be calculated by dividing PLP_SIZE by SUB_SLICE_SIZE. This option can be used, for example, when the desired resource mapping for the current PLP is such that NUM_SUB_SLICES>SUB_SLICE_SIZE. Thus, the other control signaling fields previously described (i.e. NUM_SUB_SLICES or SUB_SLICE_SIZE) can be defined to be smaller while still retaining the full equivalent functionality as the case of configuring those fields as 24-bit signaling fields.

Figure 4:
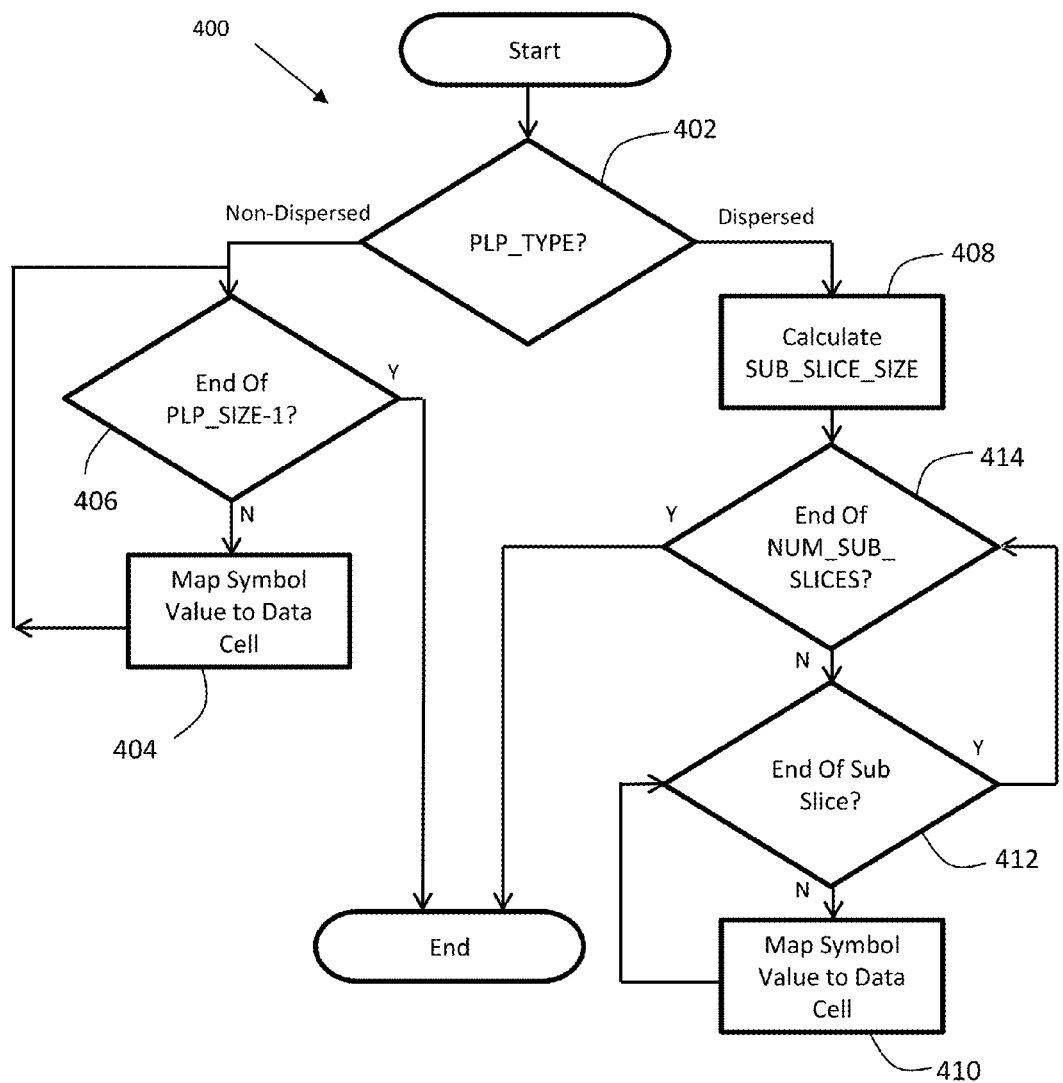
FIG. 4 illustrates an enhanced resource mapping method.

The enhanced resource mapping method 400 is further described in FIG. 4. It should be appreciated that the steps of the method described herein, although may refer to a single PLP, are repeated for each PLP (with index p) present in a current frame or partition. At step 402, the type of PLP is determined by examining the PLP_TYPE signal. In particular, the PLP_TYPE may be determined to be either non-dispersed or dispersed. If the PLP_TYPE is determined at 402 to be non-dispersed, a first modulation symbol value of the PLP is mapped to a data cell at 404. Mapping is performed using the following equation:

$$\text{DATA\_CELLS [STARTING\_POSITION}[p]+k]= \text{PLP\_DATA}[p][k] \quad \text{Equ (1)}$$

where DATA_CELLS is a one-dimensional array representing the time-frequency grid of data cell resources for the current frame or partition and is referenced using the one-dimensional logical addressing scheme and where PLP_DATA is a two-dimensional array containing the modulation symbol values for all of the PLPs present in the current frame or partition. The symbol value mapping 404 is repeated at 406 from k=0 to PLP_SIZE−1. In other words, the mapping 404 is repeated 406 for all of the modulation symbols belonging to a current PLP.

If the PLP_TYPE is determined at 402 to be dispersed, the SUB_SLICE_SIZE for a particular PLP is calculated at 408 by dividing the PLP_SIZE of the PLP by the NUM_SUB_SLICES for the PLP. This is represented by:

$$\text{SUB\_SLICE\_SIZE}=\text{PLP\_SIZE}[p]/\text{NUM\_SUB\_SLICES}[p] \quad \text{EQU (2)}$$

The modulation symbols of the PLP are then mapped to data cells at 410 based on the following equation:

$$\text{DATA\_CELLS}[j]=\text{PLP\_DATA}[p][k] \quad \text{Equ (3)}$$

where j is represented by:

$$j=\text{STARTING\_POSITION}[p]+ n*\text{SUB\_SLICE\_INTERVAL}[p]+m \quad \text{Equ (4)}$$

The symbol value mapping 410 is repeated at 412 from m=0 to SUB_SLICE_SIZE−1. In other words, the mapping 410 is repeated 412 for all of the modulation symbols belonging to a current sub-slice of a current PLP. This is also repeated at 414 from n=0 to NUM_SUB_SLICES[p]−1. In other words, the mapping 410 for all modulation symbols belonging to a current sub-slice of a current PLP is also repeated at 414 for all sub-slices of the current PLP. It should be appreciated that the value 'k' referenced in Equ (3) is incremented after each symbol value mapping at 410 to keep track of the location of the current modulation symbol being mapped as the algorithm moves through and maps all of the modulation symbols of the PLP_DATA array.

The example enhanced resource mapping method 400 is further illustrated via examples described herein.

Figure 5:
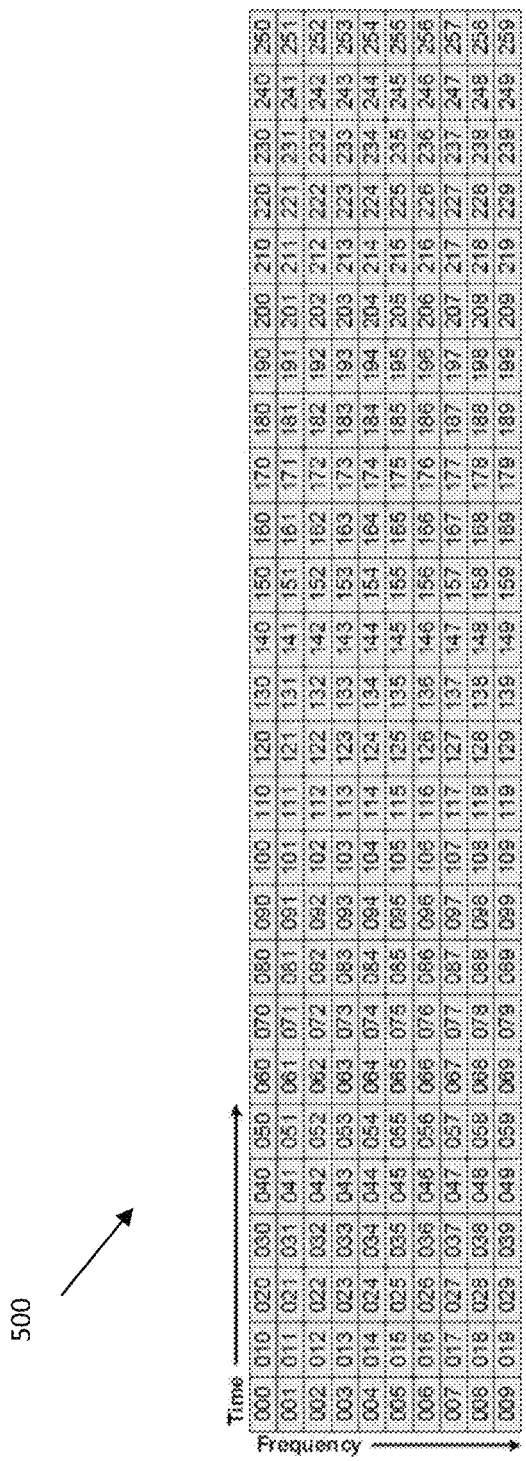
FIG. 5 illustrates an example data cell resource grid.

FIG. 5 illustrates an example data cell resource grid 500 measuring ten (10) data cells in frequency by 26 data cells (or OFDM symbols) in time. The logical addresses for all 260 data cells are as shown in the diagram and range from 000 to 259. This example data cell resource grid is used in the following example PLP mappings.

Table 1 lists example parameters for an example PLP mapping. This example includes six (6) PLPs, A through F.

TABLE 1

Example Parameters For An Example PLP Mapping

| PLP ID | PLP_ SIZE | PLP_ TYPE | STARTING_ POSITION | NUM_SUB_ SLICES | SUB_SLICE_ INTERVAL |
|---|---|---|---|---|---|
| A | 10 | Non-dispersed | 000 | n/a | n/a |
| B | 10 | Non-dispersed | 010 | n/a | n/a |
| C | 80 | Dispersed | 020 | 20 | 12 |
| D | 60 | Dispersed | 024 | 20 | 12 |
| E | 60 | Dispersed | 027 | 20 | 12 |
| F | 40 | Dispersed | 030 | 20 | 12 |

Figure 6:
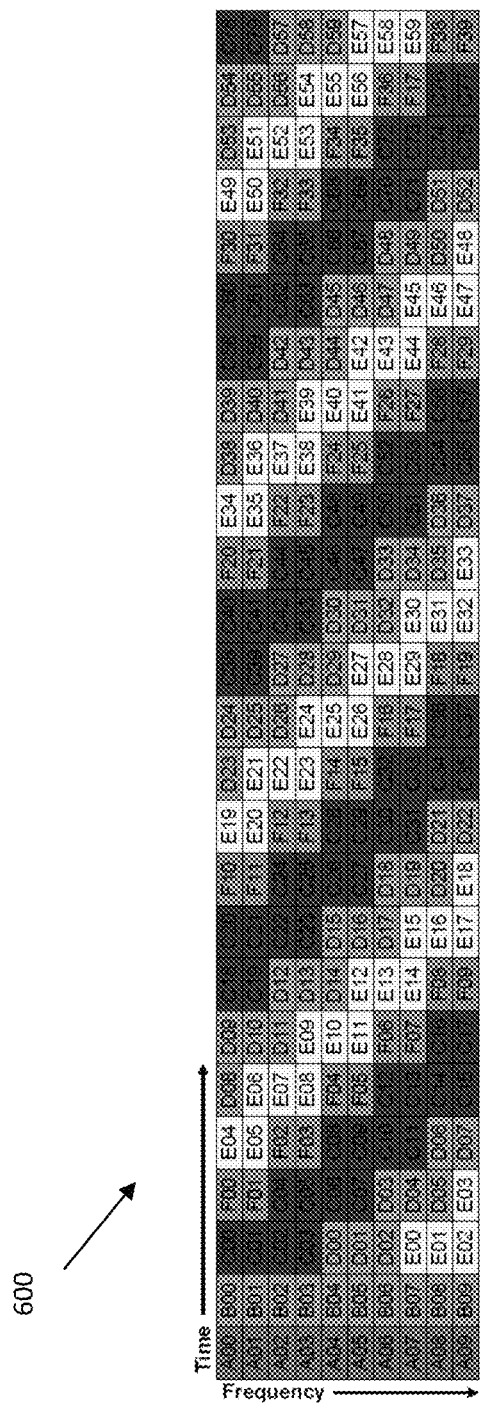
FIG. 6 illustrates an example PLP mapping.

FIG. 6 graphically illustrates an example PLP mapping 600 for the example parameters of Table 1. As illustrated, each data cell is labelled with both the PLP that it belongs to and the index of that data cell within the PLP. For instance, the label "A00" means that the data cell belongs to PLP A and is the first data cell of PLP A. It should be appreciated that this particular example mapping 600 demonstrates that the resource mapping algorithm described can achieve equal capability to the existing DVB-T2 resource mapping algorithm. As can be seen from FIG. 6, there are two non-dispersed, or Type-1, PLPs identified as A and B located at the beginning of the frame or partition, followed by four dispersed, or Type-2, PLPs identified as C, D, E and F in the remainder of the frame or partition. Each of the four dispersed PLPs consists of 20 sub-slices, and each of these four PLPs has an equal sub-slice interval or periodicity.

Table 2 lists example parameters for another example PLP mapping. This example includes four PLPs, A through D.

TABLE 2

Example Parameters For An Example PLP Mapping

| PLP ID | PLP_SIZE | PLP_TYPE | STARTING_POSITION | NUM_SUB_SLICES | SUB_SLICE_INTERVAL |
|---|---|---|---|---|---|
| A | 65 | Dispersed | 000 | 65 | 4 |
| B | 65 | Dispersed | 001 | 65 | 4 |
| C | 65 | Dispersed | 002 | 65 | 4 |
| D | 65 | Dispersed | 003 | 65 | 4 |

Figure 7:
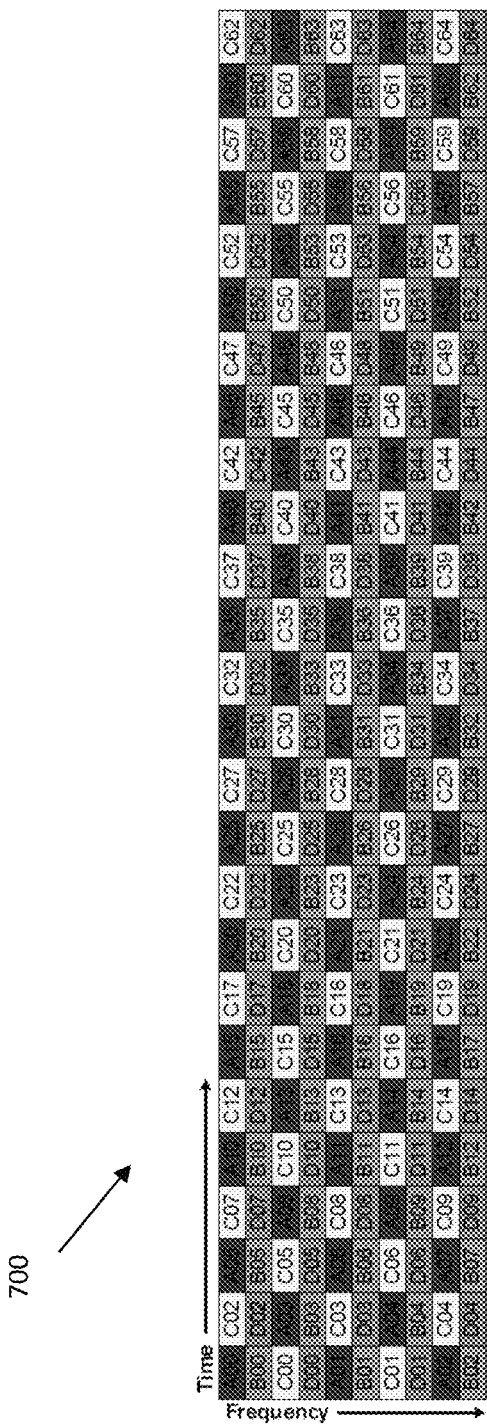
FIG. 7 illustrates another example PLP mapping.

FIG. 7 graphically illustrates an example PLP mapping 700 for the example parameters of Table 2. It should be appreciated that this particular example mapping 700 demonstrates the ability to interleave multiple PLPs in both time and frequency on a data cell by data cell basis. This yields the maximum time and frequency diversity by spreading each PLP across the full bandwidth and the full frame length.

Table 3 lists example parameters for another example PLP mapping. This example includes six (6) PLPs, A through F.

TABLE 3

Example Parameters For An Example PLP Mapping

| PLP ID | PLP_SIZE | PLP_TYPE | STARTING_POSITION | NUM_SUB_SLICES | SUB_SLICE_INTERVAL |
|---|---|---|---|---|---|
| A | 80 | Dispersed | 000 | 20 | 13 |
| B | 30 | Dispersed | 004 | 10 | 26 |
| C | 100 | Dispersed | 007 | 20 | 13 |
| D | 10 | Dispersed | 012 | 10 | 26 |
| E | 30 | Dispersed | 017 | 10 | 26 |
| F | 10 | Dispersed | 025 | 10 | 26 |

Figure 8:
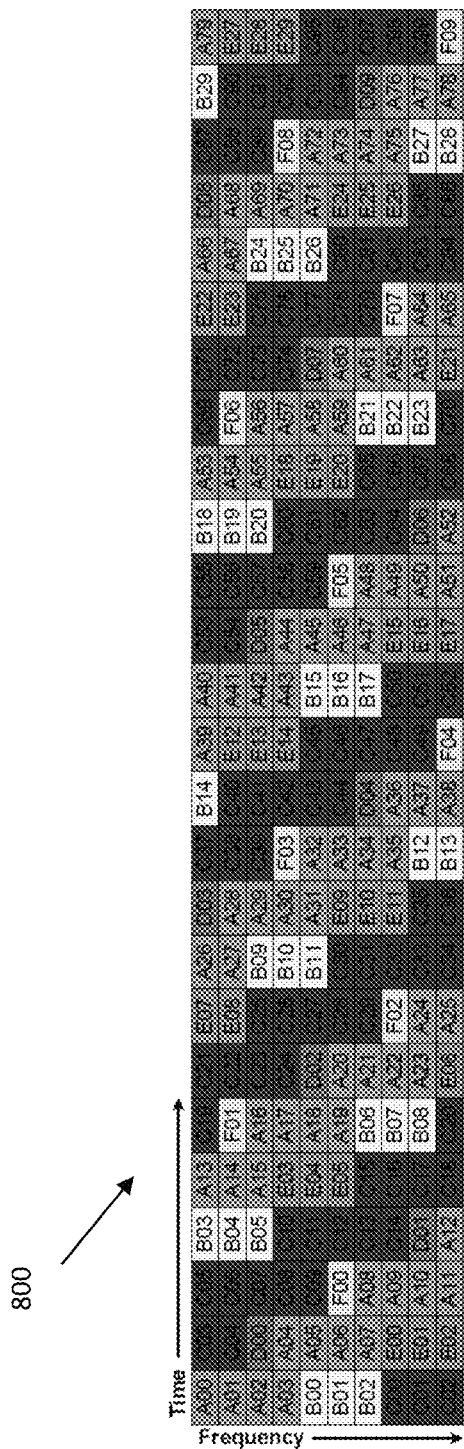
FIG. 8 illustrates another example PLP mapping.

FIG. 8 graphically illustrates an example PLP mapping 800 for the example parameters of Table 3. It should be appreciated that this particular example mapping 800 demonstrates the ability to mix or interleave PLPs with different periodicities or sub-slice intervals. As illustrated, the two largest PLPs identified as A and C each consists of 20 sub-slices and have a sub-slice interval of 13. The four smallest PLPs identified as B, D, E and F are essentially interleaved with each other. Thus B and E are mutually interleaved, as are D and F. Each of these smaller PLPs consists of only ten (10) sub-slices and has a sub-slice interval of 26, which is twice that of the two larger PLPs A and C.

Table 4 lists the parameters for another example PLP mapping. This example includes eight PLPs, A through H.

TABLE 4

Example Parameters For An Example PLP Mapping

| PLP ID | PLP_SIZE | PLP_TYPE | STARTING_POSITION | NUM_SUB_SLICES | SUB_SLICE_INTERVAL |
|---|---|---|---|---|---|
| A | 10 | Non-dispersed | 000 | n/a | n/a |
| B | 80 | Dispersed | 010 | 20 | 12 |
| C | 30 | Dispersed | 014 | 10 | 12 |
| D | 60 | Dispersed | 017 | 20 | 12 |
| E | 8 | Dispersed | 020 | 4 | 12 |
| F | 32 | Dispersed | 068 | 16 | 12 |
| G | 30 | Dispersed | 134 | 10 | 12 |
| H | 10 | Non-dispersed | 250 | n/a | n/a |

Figure 9:
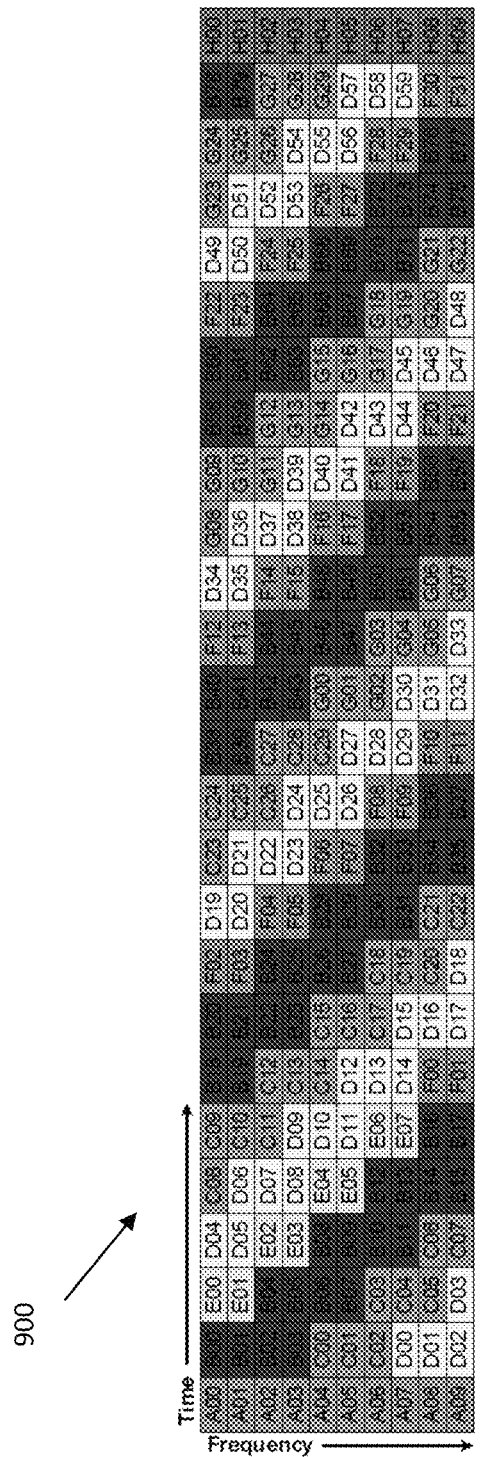
FIG. 9 illustrates another example PLP mapping.

FIG. 9 graphically illustrates an example PLP mapping 900 for the example parameters of Table 4. It should be appreciated that this particular example mapping 900 demonstrates both a mix of non-dispersed PLPS, identified as A and H, and dispersed PLPs, identified as B, C, D, E, F and G. In addition, the example mapping 900 demonstrates PLPs consisting of different numbers of sub-slices and initial start positions at different relative locations within the frame or partition. With respect to the latter characteristic, dispersed PLPs B, C, D and E start near the beginning of the frame or partition, while dispersed PLPs F and G begin approximately one-quarter and one-half of the way through the frame or partition, respectively.

Table 5 lists the parameters for another example PLP mapping. This example includes six (6) PLPs, A through F.

TABLE 5

Example Parameters For An Example PLP Mapping

| PLP ID | PLP_SIZE | PLP_TYPE | STARTING_POSITION | NUM_SUB_SLICES | SUB_SLICE_INTERVAL |
|---|---|---|---|---|---|
| A | 52 | Dispersed | 000 | 26 | 10 |
| B | 39 | Dispersed | 002 | 13 | 10 |
| C | 26 | Dispersed | 005 | 26 | 10 |
| D | 16 | Dispersed | 006 | 4 | 10 |
| E | 88 | Dispersed | 046 | 22 | 10 |
| F | 39 | Dispersed | 132 | 13 | 10 |

Figure 10:
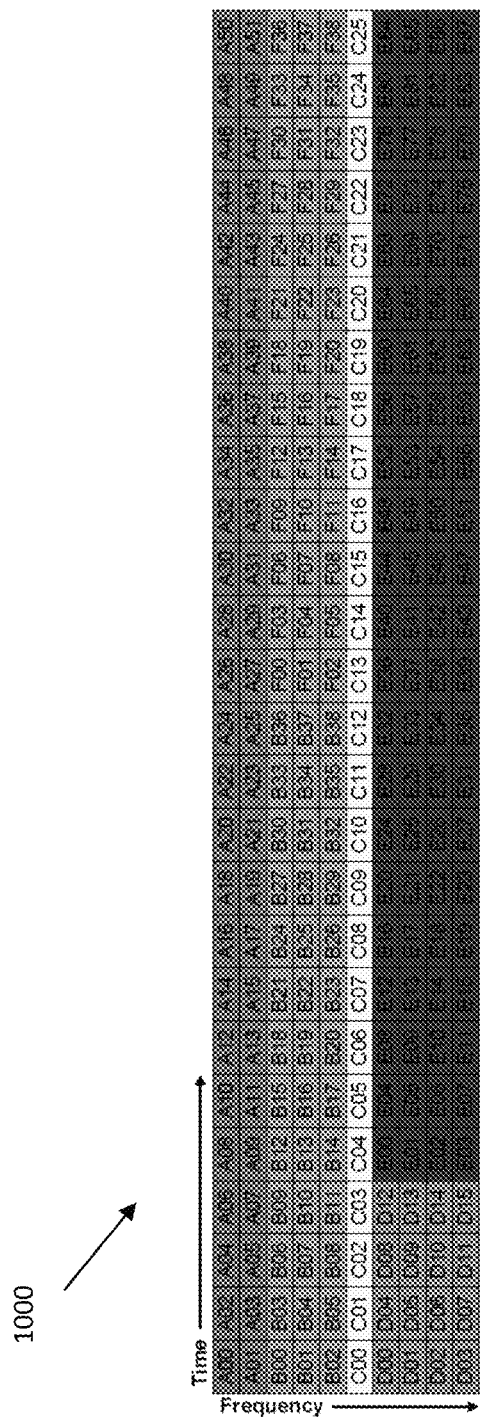
FIG. 10 illustrates another example PLP mapping.

FIG. 10 graphically illustrates an example PLP mapping 1000 for the example parameters of Table 5. This particular example mapping 1000 demonstrates the capability of time-division multiplexing and/or frequency-division multiplexing PLPs within the data resource grid. It should be appreciated that this is "quasi" frequency-division multiplexing, since scattered pilot insertion may cause the resulting mappings of data cells to OFDM subcarriers to be offset slightly from one OFDM symbol to another. For example, data cell C09 might map to OFDM subcarrier k in OFDM symbol m, and data cell C10 might map to OFDM subcarrier k+1 in OFDM symbol m+1. However, the ability to map a particular PLP to a particular time-frequency region of the overall frame or partition is still highly beneficial. It should be appreciated that optional frequency interleaving 110 would be disabled in order to achieve this frequency-division multiplexing effect. It should be appreciated that, in this example PLP mapping 1000, the six (6) PLPs generally have a different number of sub-slices per PLP. However, for frequency-division multiplexing, the sub-slice interval needs to be set equal to the number of data cells in one OFDM symbol, as is the case here. Thus, SUB_SLICE_INTERVAL=10 in this example.

It should be appreciated that the enhanced resource mapping method described herein may be incorporated in and used with the ATSC 3.0 digital broadcast standard. However, it should be further appreciated that the enhanced resource mapping method and associated signaling fields described may be implemented and expanded in other future broadcast standards. For example, it should be appreciated that more flexibility could be possible by adding more signaling, for example each data cell could be signaled separately, but such additional signaling may be expensive to implement in terms of resources. In addition, it should be appreciated that a subset of the signaling described may be used to relax a subset of the constraints described without necessarily utilizing all of the signaling to relax all of the constraints.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A transmitter, comprising:
  a memory that stores instructions; and
  a processor, upon executing the instructions, configured to:
    determine, for a physical layer pipe (PLP), a PLP start position, wherein the PLP start position corresponds to a data cell of a sequentially indexed array of data cells, the sequentially indexed array of data cells being within a frame;
    determine, for the frame, whether the PLP is non-dispersed; and in response to determining that the PLP is non-dispersed, populate a contiguous data cell subset of the sequentially indexed array, the contiguous data cell subset having a size equal to a size of the PLP with a plurality of modulation symbols associated with the PLP.

2. The transmitter of claim 1, wherein the contiguous data cell subset corresponds to a plurality of contiguous data cells of the sequentially indexed array.

3. The transmitter of claim 1, wherein the contiguous data cell subset begins with a data cell associated with the PLP start position.

4. The transmitter of claim 1, wherein the processor is further configured to: determine, for the PLP, a second PLP start position, wherein the second PLP start
  position corresponds to a second data cell of a second sequentially indexed array of data cells, the second sequentially indexed array of data cells being within a second frame;
  determine, for the second frame, whether the PLP is non-dispersed; and in response to determining that the PLP is non-dispersed, populate a second contiguous data cell subset of the second sequentially indexed array, the second contiguous data cell subset having a second size equal to a second size of the PLP with a second plurality of modulation symbols associated with the PLP.

5. The transmitter of claim 4, wherein the second PLP start position is equal to the PLP start position and the second size is equal to the size.

6. A transmitter, comprising:
  a memory that stores instructions; and
  a processor, upon executing the instructions, configured to:
    determine, for a frame, whether a physical layer pipe (PLP) is dispersed; and in response to determining that the PLP is dispersed:
    determine, for the PLP, a sub-slice interval, a PLP start position, a number of sub-slices, and a PLP size, wherein the PLP start position corresponds to a data cell of a sequentially indexed array of data cells, the sequentially indexed array of data cells being within the frame;
    divide the PLP size with the number of sub-slices to calculate a sub-slice
    size for the PLP; and
    populate a contiguous data cell subset of the sequentially indexed array having a size equal to the sub-slice size with a plurality of modulation symbols associated with the PLP.

7. The transmitter of claim 6, wherein the contiguous data cell subset corresponds to a plurality of contiguous data cells of the sequentially indexed array.

8. The transmitter of claim 6, wherein the contiguous data cell subset begins with a data cell associated with the PLP start position.

9. The transmitter of claim 6, wherein the processor is further configured to:
  populate a second contiguous data cell subset of the sequentially indexed array with a second plurality of modulation symbols associated with the PLP.

10. The transmitter of claim 9, wherein the second contiguous data cell subset corresponds to a plurality of contiguous data cells of the sequentially indexed array having a size equal to the sub-slice size starting from a second data cell corresponding to the PLP start position incremented by a multiple of the sub-slice interval.

11. The transmitter of claim 10, wherein the multiple is an integer value greater than or equal to 1.

12. The transmitter of claim 6, wherein the processor is further configured to: populate the PLP start position, the number of sub-slices, the sub-slice interval, and the PLP size in a preamble of the frame.

13. The transmitter of claim 6, wherein the PLP may be non-dispersed for a subsequent frame.

14. The transmitter of claim 6, wherein the processor is further configured to: determine, for a second frame, whether the PLP is dispersed; and
  in response to determining that the PLP is dispersed for the second frame:
    determine, for the PLP, a second sub-slice interval, a second PLP start position, a second number of sub-slices, and a second PLP size, wherein the second PLP start position corresponds to a second data cell of a second sequentially indexed array of data cells, the second sequentially indexed array of data cells being within the second frame;
    divide the second PLP size with the second number of sub-slices to calculate a second sub-slice size for the PLP; and
    populate a second contiguous data cell subset of the second sequentially indexed array having a second size equal to the second sub-slice size with a second plurality of modulation symbols associated with the PLP;
  wherein the second plurality of modulation symbols is distinct from the plurality of modulation symbols.

15. The transmitter of claim 14, wherein the second PLP start position is equal to the PLP start position, the second PLP size is equal to the PLP size, the second number of sub-slices is equal to the number of sub-slices, and the second sub-slice interval is equal to the sub-slice interval.

16. A method for mapping physical layer pipes (PLPs) to a sequentially indexed array of data cells at a transmitter, comprising:
  determining whether a PLP is non-dispersed for a frame; and
  in response to determining that the PLP is non-dispersed:
  determining a PLP start position and a PLP size, wherein the PLP start position corresponds to a data cell of the sequentially indexed array of data cells within the frame; and
  populating a contiguous data cell subset of the sequentially indexed array having a size equal to the PLP size with a plurality of modulation symbols associated with the PLP.

17. The method of claim 16, wherein the contiguous data cell subset corresponds to a plurality of contiguous data cells of the sequentially indexed array.

18. The method of claim 16, wherein the contiguous data cell subset begins with a data cell associated with the PLP start position.

19. The method of claim 16, further comprising:
  determining whether the PLP is non-dispersed for a second frame; and
  in response to determining that the PLP is non-dispersed for the second frame:
    determining, for the PLP, a second PLP start position and a second PLP size, wherein the second PLP start position corresponds to a second data cell of a second sequentially indexed array of data cells, the second sequentially indexed array of data cells being within a second frame; and
    populating a second contiguous data cell subset of the second sequentially indexed array, the second contiguous data cell subset having a second size equal to the second PLP size with a second plurality of modulation symbols associated with the PLP.

20. The method of claim 19, wherein the second PLP start position is equal to the PLP start position and the second size is equal to the PLP size.

21. A method for mapping physical layer pipes (PLPs) to a sequentially indexed array of data cells at a transmitter, comprising:
  determining whether a PLP is dispersed for a frame; and
    in response to determining that the PLP is dispersed:
    determining, for the PLP, a sub-slice interval, a PLP start position, a number of sub-slices, and a PLP size, wherein the PLP start position corresponds to a data cell of the sequentially indexed array of data cells within the frame;
  calculating a sub-slice size by dividing the PLP size by the number of sub-slices; and
  populating a contiguous data cell subset of the sequentially indexed array having a size equal to the sub-slice size with a plurality of modulation symbols associated with the PLP.

22. The method of claim 21, wherein the contiguous data cell subset corresponds to a plurality of contiguous data cells of the sequentially indexed array.

23. The method of claim 21, wherein the contiguous data cell subset begins with a data cell associated with the PLP start position.

24. The method of claim 21, further comprising:
  populating a second data cell subset of the sequentially indexed array with a second plurality of modulation symbols associated with the PLP.

25. The method of claim 24, wherein the second data cell subset corresponds to a plurality of contiguous data cells of the sequentially indexed array equal to the sub-slice size and starting from a second data cell corresponding to the PLP start position incremented by a multiple of the sub-slice interval.

26. The method of claim 25, wherein the multiple is an integer value greater than or equal to 1.

27. The method of claim 21, further comprising:
  populating the PLP start position, the number of sub-slices, and the PLP size in a preamble of the frame.

28. The method of claim 21, wherein the PLP is non-dispersed for a subsequent frame.

29. The method of claim 21, further comprising:
  determining whether the PLP is dispersed for a second frame; and in response to determining that the PLP is dispersed for the second frame:
    determining, for the PLP, a second sub-slice interval, a second PLP start position, a second number of sub-slices, and a second PLP size, wherein the second PLP start position corresponds to a second data cell of a second sequentially indexed array of data cells, the second sequentially indexed array of data cells being within the second frame;

dividing the second PLP size with the second number of sub-slices to calculate a second sub-slice size for the PLP; and populating a second contiguous data cell subset of the second sequentially indexed array having a size equal to the second sub-slice size with a second plurality of modulation symbols associated with the PLP.

30. The method of claim 29, wherein the second PLP start position is equal to the PLP start position, the second PLP size is equal to the PLP size, the second number of subslices is equal to the number of sub-slices, and the second sub-slice interval is equal to the sub-slice interval.

* * * * *